(12) United States Patent
Wu et al.

(10) Patent No.: US 12,511,077 B2
(45) Date of Patent: Dec. 30, 2025

(54) METHOD AND DEVICE FOR COPY COMMAND EXECUTION IN DATA STORAGE MANAGEMENT SYSTEM

(71) Applicant: Samsung Electronics Co., Ltd., Gyeonggi-do (KR)

(72) Inventors: Chun-Chu Chen-Jhy Archie Wu, San Carlos, CA (US); Sumanth Jannyavula Venkata, Pleasanton, CA (US); Young Deok Kim, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 30 days.

(21) Appl. No.: 18/526,172

(22) Filed: Dec. 1, 2023

(65) Prior Publication Data

US 2025/0013387 A1    Jan. 9, 2025

Related U.S. Application Data

(60) Provisional application No. 63/511,997, filed on Jul. 5, 2023.

(51) Int. Cl.
*G06F 3/06* (2006.01)
*G06F 12/02* (2006.01)

(52) U.S. Cl.
CPC .......... *G06F 3/0659* (2013.01); *G06F 3/0608* (2013.01); *G06F 3/0673* (2013.01); *G06F 12/0292* (2013.01); *G06F 2212/1041* (2013.01)

(58) Field of Classification Search
CPC .... G06F 3/0659; G06F 3/0608; G06F 3/0673; G06F 3/061; G06F 3/0613; G06F 3/0604;
(Continued)

(56) References Cited

U.S. PATENT DOCUMENTS 6,018,747 A    1/2000 Burns et al.
6,397,302 B1   5/2002 Razdan et al.
(Continued)

FOREIGN PATENT DOCUMENTS

EP    3 945 407    2/2022

OTHER PUBLICATIONS

Awati, Rahul. "Definition no op (no operation)," Tech Target, May 2023, https://www.techtarget.com/whatis/definition/no-op-no-operation.*

(Continued)

*Primary Examiner* — Tracy A Warren
(74) *Attorney, Agent, or Firm* — The Farrell Law Firm, P.C.

(57) ABSTRACT

Methods and devices are provided in which a controller of a storage device generates copy-read subcommands and copy-write subcommands of a copy command. The controller executes a blocking no-operation (NOP) command that spans a first storage address range of the copy-write subcommands in a first storage address space. The controller generates a mapping of the copy-write subcommands from the first storage address range, to mapped copy-write subcommands at a corresponding second storage address range in a second storage address space that is higher than a maximum storage address of the first storage address space. The controller executes the copy-read subcommands and the mapped copy-write subcommands. The mapped copy-write subcommands copy data for execution at the first storage address range.

20 Claims, 10 Drawing Sheets

(58) Field of Classification Search
CPC .... G06F 3/065; G06F 3/0658; G06F 12/0292;
G06F 2212/1041; G06F 9/30076
See application file for complete search history.

(56) References Cited

U.S. PATENT DOCUMENTS

| | | | |
|---|---|---|---|
| 7,644,248 B2 | 1/2010 | Subashchandrabose et al. | |
| 8,352,681 B2 | 1/2013 | Sakai et al. | |
| 8,392,683 B1* | 3/2013 | Confalonieri | G06F 12/0246 |
| | | | 711/163 |
| 10,372,668 B2 | 8/2019 | Kang et al. | |
| 10,466,903 B2 | 11/2019 | Benisty et al. | |
| 11,556,268 B2 | 1/2023 | Benisty et al. | |
| 2004/0049649 A1* | 3/2004 | Durrant | G06F 12/0808 |
| | | | 712/E9.034 |
| 2005/0135176 A1* | 6/2005 | Ramakrishnan | G11C 8/06 |
| | | | 365/230.01 |
| 2006/0077748 A1* | 4/2006 | Kim | G11C 8/06 |
| | | | 365/230.06 |
| 2006/0143245 A1* | 6/2006 | Iyer | G06F 13/28 |
| 2019/0018805 A1 | 1/2019 | Benisty | |
| 2020/0341908 A1* | 10/2020 | Shin | G06F 12/0246 |
| 2022/0035530 A1* | 2/2022 | Vikram Singh | G06F 3/0659 |
| 2022/0261183 A1 | 8/2022 | Horspool et al. | |
| 2022/0342550 A1* | 10/2022 | Benisty | G06F 3/0659 |
| 2024/0361957 A1* | 10/2024 | Hahn | G06F 3/061 |

OTHER PUBLICATIONS

European Search Report dated Nov. 25, 2024 issued in counterpart application No. 24185015.5-1218, 9 pages.
EP Communication Report dated Jul. 11, 2025 issued in counterpart application No. 24185015.5-1218, 8 pages.

* cited by examiner

METHOD AND DEVICE FOR COPY COMMAND EXECUTION IN DATA STORAGE MANAGEMENT SYSTEM

PRIORITY

This application is based on and claims priority under 35 U.S.C. § 119(e) to U.S. Provisional Patent Application Ser. No. 63/511,997, filed on Jul. 5, 2023, the entire contents of which are incorporated herein by reference.

TECHNICAL AREA

The present disclosure relates generally to data storage management systems, and more particularly, to a method for copy command execution in a data storage management system.

BACKGROUND

The present background section is intended to provide context only, and the disclosure of any concept in this section does not constitute an admission that said concept is prior art.

Complexities in data storage management continue to grow with increasing computational demand. The computational demand may be demonstrated through an increase in commands (e.g., read commands, write commands, or copy commands), issued by a host and inserted into a data storage management system for execution. A copy command may be composed of multiple pairs of copy-read and copy-write subcommands, and atomicity for the copy-write subcommands should be maintained such that all are executed and are indivisible during execution. However, a need exists for an approach that maintains copy command atomicity without requiring additional buffer space, delaying non-copy commands, or taxing resource allocation within the data storage device.

SUMMARY

According to an embodiment, a method is provided in which a controller of a storage device generates copy-read subcommands and copy-write subcommands of a copy command. The controller executes a blocking no-operation (NOP) command that spans a first storage address range of the copy-write subcommands in a first storage address space. The controller generates a mapping of the copy-write subcommands from the first storage address range, to mapped copy-write subcommands at a corresponding second storage address range in a second storage address space that is higher than a maximum storage address of the first storage address space. The controller executes the copy-read subcommands and the mapped copy-write subcommands. The mapped copy-write subcommands copy data for execution at the first storage address range.

According to this embodiment, the copy command may be received at the storage device from a host device. The controller may generate and insert the blocking NOP command for execution at the storage device. The controller may insert the copy-read subcommands and the copy-write subcommands for execution at the storage device, based on execution of the blocking NOP command. The controller may insert a non-copy command for execution at the storage device. Based on insertion of the copy-read subcommands, the copy-write subcommands, and the non-copy command, the controller may perform a first overlap check based on storage addresses of the copy-read subcommands, the copy-write subcommands, the non-copy command, and the blocking NOP command.

According to this embodiment, based on the first overlap check, the controller may determine storage address overlap between the copy-write subcommands and the blocking NOP command. The mapping of the copy-write subcommands to the mapped copy-write subcommands is based on the storage address overlap. Based on the first overlap check, the controller may determine storage address overlap between the non-copy command and the blocking NOP command, which blocks the non-copy command from execution at the storage device. Based on generating the mapping of the copy-write subcommands to the mapped copy-write subcommands, the controller may perform a second overlap check based on the mapped copy-write subcommands. The controller may clear the copy-write subcommands from the first storage address range, along with the copy-read subcommands, based on completing execution. The controller may clear the blocking NOP command from the first storage address range based on clearing of the copy-write subcommands. The controller may perform a third overlap check based on the non-copy command. The controller may execute the non-copy command within the first storage address range.

According to this embodiment, based on the first overlap check, the controller may determine partial storage address overlap between the non-copy command and the blocking NOP command. The controller may extend the blocking NOP command beyond the first storage address range resulting in an extended blocking NOP command with full storage address overlap with the non-copy command and at least partial storage address overlap with a copy-read subcommand. The controller may generate a mapping of at least a portion of the copy-read subcommand, having storage address overlap with the extended blocking NOP command, to a storage address higher than the maximum address of the storage device. The copy-read subcommands may be executed using the at least a portion of the copy-read subcommand.

According to this embodiment, based on the first overlap check, the controller may determine at least partial storage addresses overlap between a copy-read subcommand and the blocking NOP command. The controller may generate a mapping of at least a portion of the copy-read subcommand, having storage address overlap with the blocking NOP command, to a storage address higher than the maximum address of the storage device. The copy-read subcommands may be executed using the at least a portion of the copy-read subcommand.

According to an embodiment, a storage device is provided that includes a storage medium and a controller. The controller is configured to generate copy-read subcommands and copy-write subcommands of a copy command, and execute a blocking NOP command that spans a first storage address range of the copy-write subcommands in a first storage address space. The controller is also configured to generate a mapping of the copy-write subcommands from the first storage address range, to mapped copy-write subcommands at a corresponding second storage address range in a second storage address space that is higher than a maximum storage address of the first storage address space, and execute the copy-read subcommands and the mapped copy-write subcommands. The mapped copy-write subcommands copy data for execution at the first storage address range.

According to this embodiment, the controller may be further configured to receive the copy command from a host device, generate the blocking NOP command and inserting the blocking NOP command for execution, insert the copy-read subcommands and the copy-write subcommands for execution, based on execution of the blocking NOP command, and insert a non-copy command for execution. The controller may be further configured to, based on insertion of the copy-read subcommands, the copy-write subcommands, and the non-copy command, perform a first overlap check based on storage addresses of the copy-read subcommands, the copy-write subcommands, the non-copy command, and the blocking NOP command.

According to this embodiment, the controller may be further configured to determine, based on the first overlap check, storage address overlap between the copy-write subcommands and the blocking NOP command. The mapping of the copy-write subcommands to the mapped copy-write subcommands is based on the storage address overlap. The controller may also be configured to determine, based on the first overlap check, storage address overlap between the non-copy command and the blocking NOP command, which blocks the non-copy command from execution at the storage device. The controller may be further configured to, based on generating the mapping of the copy-write subcommands to the mapped copy-write subcommands, perform a second overlap check based on the mapped copy-write subcommands. The controller may be further configured to clear the copy-write subcommands from the first storage address range, along with the copy-read subcommands, based on completing execution, clear the blocking NOP command from the first storage address range based on clearing of the copy-write subcommands, perform a third overlap check based on the non-copy command, and execute the non-copy command within the first storage address range.

According to this embodiment, the controller may be further configured to determine, based on the first overlap check, partial storage address overlap between the non-copy command and the blocking NOP command, and extend the blocking NOP command beyond the first storage address range resulting in an extended blocking NOP command with full storage address overlap with the non-copy command and at least partial storage address overlap with a copy-read subcommand. The controller may also be configured to generate a mapping of at least a portion of the copy-read subcommand, having storage address overlap with the extended blocking NOP command, to a storage address higher than the maximum address of the storage device. The copy-read subcommands may be executed using the at least a portion of the copy-read subcommand.

According to this embodiment, the controller may be further configured to determine, based on the first overlap check, at least partial storage addresses overlap between a copy-read subcommand and the blocking NOP command. The controller may also be configured to generate a mapping of at least a portion of the copy-read subcommand, having storage address overlap with the blocking NOP command, to a storage address higher than the maximum address of the storage device. The copy-read subcommands may be executed using the at least a portion of the copy-read subcommand.

According to an embodiment, a storage device is provided that includes a copy command processor configured to generate copy-read subcommands and copy-write subcommands of a copy command, a command execution module configured to execute a blocking NOP command that spans a first storage address range of the copy-write subcommands in a first storage address space, and an overlap check module configured to determine storage address overlap based on the copy-read subcommands, the copy-write subcommands, and the blocking NOP command. The storage device also includes a shadow processor configured to generate a mapping of the copy-write subcommands from the first storage address range, to mapped copy-write subcommands at a corresponding second storage address range in a second storage address space that is higher than a maximum storage address of the first storage address space, based on determining storage address overlap between the copy-write subcommands and the blocking NOP command. The command execution module is further configured to execute the copy-read subcommands and the mapped copy-write subcommands. The mapped copy-write subcommands copy data for execution at the first storage address range.

According to this embodiment, the overlap check module may be further configured to clear the copy-write subcommands from the first storage address range, along with the copy-read subcommands, based on completing atomic execution, clear the blocking NOP command from the first storage address range based on clearing of the copy-write subcommands. The command execution module may be further configured to execute a non-copy command within the first storage address range. The overlap check module may perform an overlap check based on the non-copy command.

According to this embodiment, the overlap check module may be further configured to determine partial storage address overlap between a non-copy command and the blocking NOP command. The shadow processor may be further configured to extend the blocking NOP command beyond the first storage address range resulting in an extended blocking NOP command with full storage address overlap with the non-copy command and at least partial storage address overlap with a copy-read subcommand. The shadow processor may be further configured to generate a mapping of at least a portion of the copy-read subcommand, having storage address overlap with the extended blocking NOP command, to a storage address higher than the maximum address of the storage device. The command execution module may execute the copy-read subcommands using the at least a portion of the copy-read subcommand.

According to this embodiment, the overlap check module may be further configured to determine at least partial storage addresses overlap between a copy-read subcommand and the blocking NOP command. The shadow processor may be further configured to generate a mapping of at least a portion of the copy-read subcommand, having storage address overlap with the blocking NOP command, to a storage address higher than the maximum address of the storage device. The command execution module may execute the copy-read subcommands using the at least a portion of the copy-read subcommand.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale. The above and other aspects, features, and advantages of certain embodiments of the present disclosure will be more apparent from the following detailed description, taken in conjunction with the accompanying drawings, in which.

DETAILED DESCRIPTION

Figure 1:
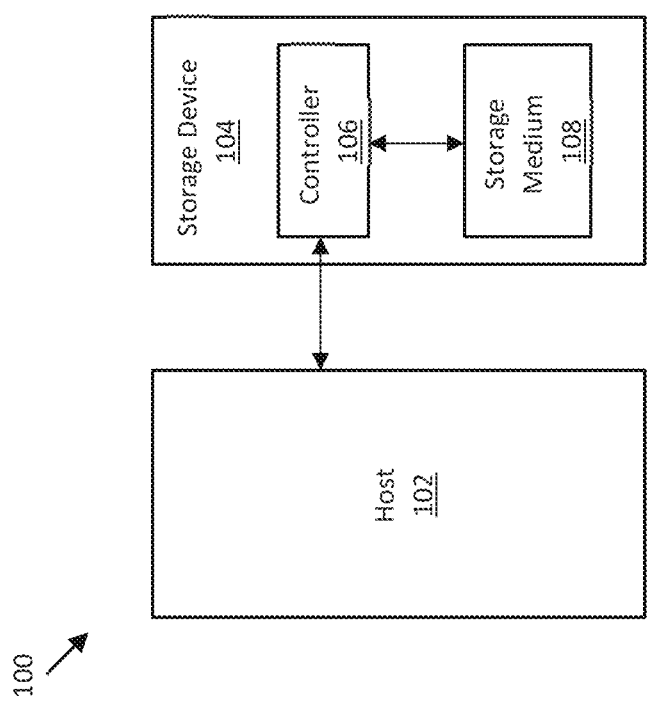
FIG. 1 is a diagram illustrating a data storage management system for processing commands in an electronic device, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

An electronic device, according to one embodiment, may be one of various types of electronic devices utilizing storage devices (e.g., memory devices). The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/

Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), Nvlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

In data storage management, for commands issued by a host and carried out in a data storage device, overlap may be determined with respect to a destination address (e.g., a logical block address (LBA)) in the storage address space of the data storage device. LBA overlap indicates that an inserted command has a destination LBA that overlaps the destination LBA of a previously inserted command that has not yet completed execution. When no LBA overlap is detected, the inserted command may be executed. However, when overlap is detected, the inserted command may be held pending until the previously inserted command completes execution. Upon the previously inserted command being cleared after execution, the pending command may be released from the pending state and executed. Accordingly, commands may be concurrently executed across different LBAs of the storage address space, or may be held pending when LBA overlap exists with another command.

A copy command in a data storage management system may be composed of multiple pairs of copy-read and copy-write subcommands, which are inserted as pairs into the system. The copy-read subcommands may be read from one or more sources, and the copy-write subcommands may be written to a single destination in contiguous LBAs of the storage address space. Atomicity for the copy-write subcommands should be maintained when another non-copy command is inserted that overlaps destination LBAs of a copy-write subcommand.

In order to maintain atomicity, approaches have included utilizing additional buffer space for integrating the copy-write subcommands into a single continuous operation, blocking a non-copy command and inserting all copy-read and copy-write subcommands simultaneously before unblocking the non-copy command, and utilizing a blocking no-operation (NOP) command inserted after the copy-write subcommands to block subsequently inserted overlapping non-copy commands. Embodiments of the disclosure enable autonomous execution of the copy-write subcommands through initial insertion of a blocking command across the LBAs of the copy-write subcommands and mapping of the copy-write subcommands to a shadow storage address space without any overlap.

FIG. 1 is a diagram illustrating a data storage management system for processing commands in an electronic device, according to an embodiment. A storage system 100 includes a host 102 and a storage device 104 (e.g., a memory device). Although one host and one storage device is depicted, the storage system 100 may include multiple hosts and/or multiple storage devices. The storage device 104 may be an SSD, a universal flash storage (UFS), etc. The storage device 104 includes a controller 106 and a storage medium 108 connected to the controller 106. The controller 106 may be an SSD controller, a UFS controller, etc. The storage medium 108 may include a volatile memory, a non-volatile memory, or both, and may include one or more flash memory chips (or other storage media). The controller 106 may include one or more processors, one or more error correction circuits, one or more FPGAs, one or more host interfaces, one or more flash bus interfaces, etc., or a combination thereof. The controller 106 may be configured to facilitate transfer of data/commands between the host 102 and the storage medium 108. The host 102 sends data/commands to the storage device 104 to be received by the controller 106 and processed in conjunction with the storage medium 108.

Figure 2:
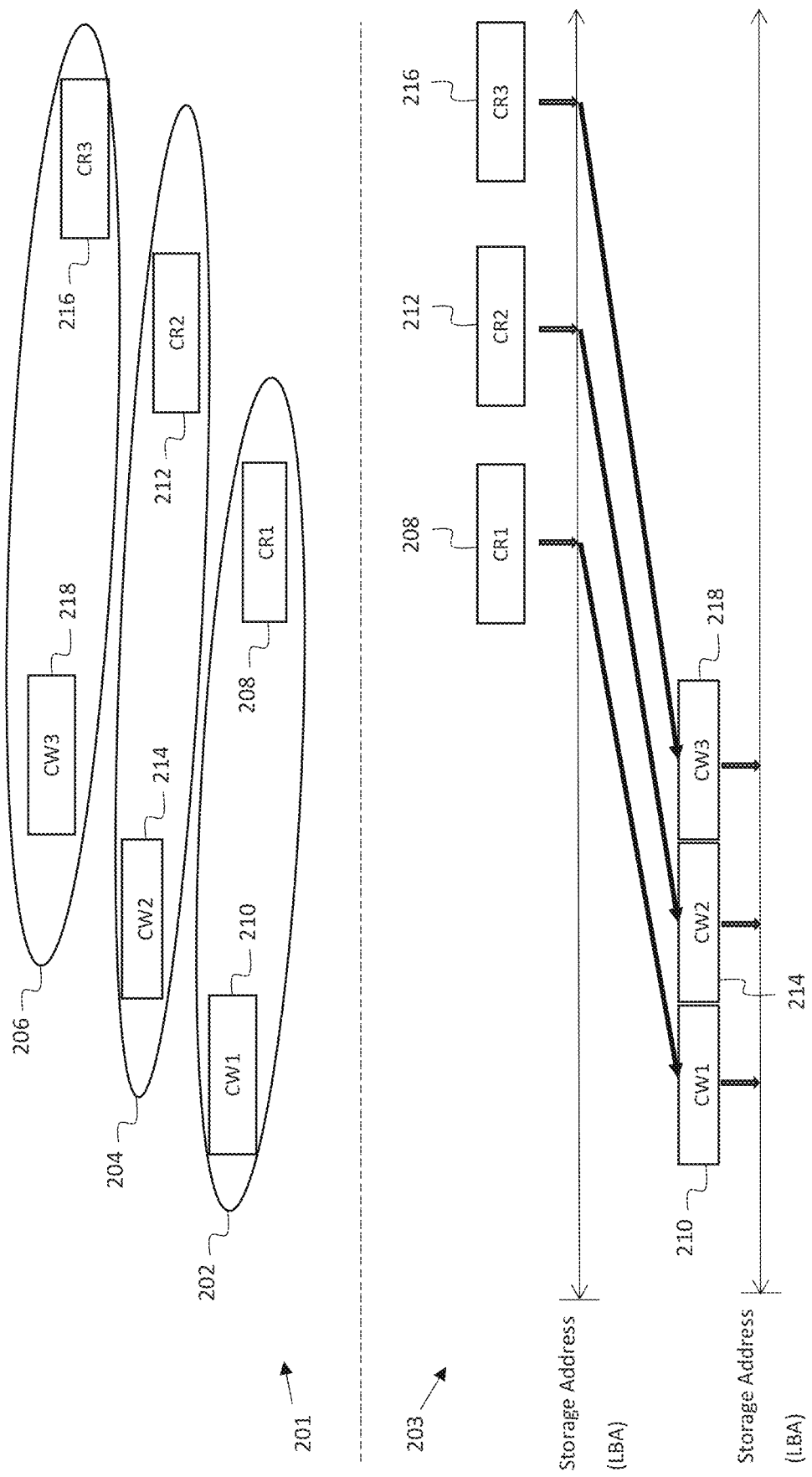
FIG. 2 is a diagram illustrating a copy command in a data storage management system, according to an embodiment.

FIG. 2 is a diagram illustrating a copy command in a data storage management system, according to an embodiment. A data storage device (e.g., the storage device 104 of FIG. 1) may receive a copy command from a host (e.g., the host 102 of FIG. 1). In a command input sequence 201, the copy command may be composed of multiple pairs of copy-read and copy-write subcommands. A copy command processor (e.g., within the controller 106 of FIG. 1) may fetch a source entry for each copy-read subcommand, and may compose copy-read and copy-write subcommand pairs of the copy command. FIG. 2 illustrates a first subcommand pair 202, a second subcommand pair 204, and a third subcommand pair 206. The number of subcommand pairs shown in FIG. 2 is for illustrative purposes only, and the disclosure is not limited thereto. A copy command may include any number of subcommand pairs. The first subcommand pair 202 includes a first copy-read subcommand CR1 208 and a first copy-write subcommand CW1 210. The second subcommand pair 204 includes a second copy-read subcommand CR2 212 and a second copy-write subcommand CW2 214. The third subcommand pair 206 includes a third copy-read subcommand CR3 216 and a third copy-write subcommand CW3 218.

After inserting the subcommands to the system for execution, an LBA overlap check (LOC) module (e.g., within the controller 106 of FIG. 1) may determine any storage address overlap in the storage address space (e.g., the storage medium 108 of FIG. 1), or more specifically, whether a given subcommand may be executed or is held pending due to LBA overlap with a previously inserted command or subcommand. LBA is used as an example of a storage address, but the disclosure is not limited thereto and other storage addresses may be utilized. FIG. 2 illustrates an embodiment having subcommands without LBA overlap. Accordingly, in an optimized execution sequence 203, the copy-read subcommands CR1 208, CR2 212, and CR3 216 may be executed, resulting in atomic execution of the copy-write subcommands CW1 210, CW2 214, and CW3 218. Specifically, the copy-write subcommands CW1 210, CW2 214, and CW3 218 may be executed atomically at contiguous LBAs of a destination storage address space.

Figure 3:
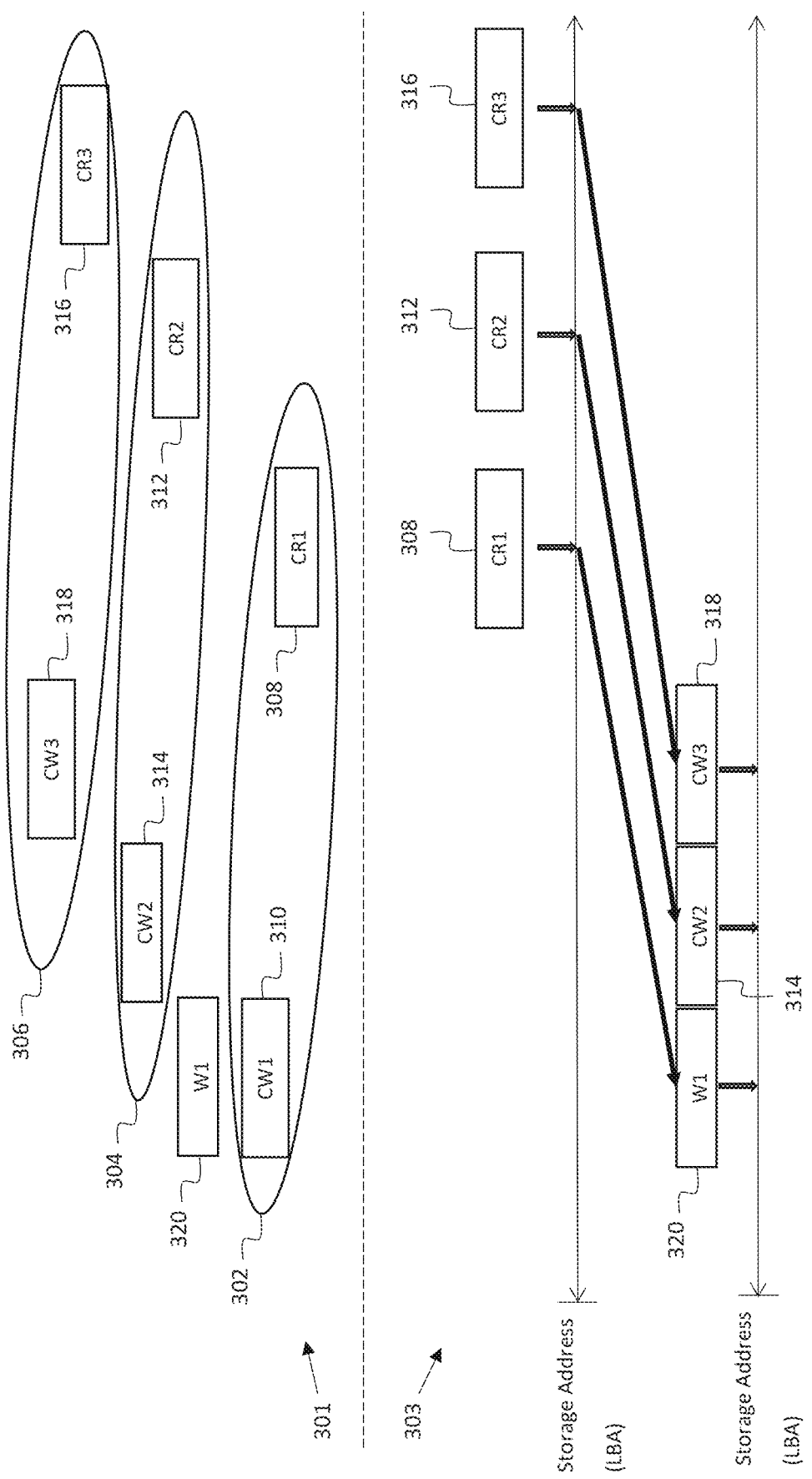
FIG. 3 is a diagram illustrating a copy command and an overlapping non-copy command in a data storage management system, according to an embodiment.

FIG. 3 is a diagram illustrating a copy command and an overlapping non-copy command in a data storage management system, according to an embodiment. The data storage device may receive a copy command and a non-copy command from the host. As described above with respect to FIG. 2, in a command input sequence 301, the copy command processor may fetch a source entry for each copy-read subcommand, and may compose copy-read and copy-write subcommand pairs 302, 304, and 306. The first subcommand pair 302 includes a first copy-read subcommand CR1 308 and a first copy-write subcommand CW1 310. The second subcommand pair 304 includes a second copy-read subcommand CR2 312 and a second copy-write subcommand CW2 314. The third subcommand pair 306 includes a third copy-read subcommand CR3 316 and a third copy-write subcommand CW3 318.

The copy subcommands may be inserted along with a write command W1 320. The LOC module may determine any overlap amongst the inserted command and subcommands. In FIG. 3, an LBA of the write command W1 320 is shown to overlap an LBA of the first copy-write subcommand CW1 310. Accordingly, in an execution sequence 303, upon execution of the first copy-read subcommand CR1 308 and the first copy-write subcommand CW1 310, the write command W1 320 may be held pending by the LOC module until the first copy-write subcommand CW1 310 is fully executed and cleared. After the first copy-write subcommand CW1 310 is cleared by the LOC module, the LOC modules may release the write command W1 320 from the pending state for execution. The execution of the write command W1 320 may occur before or with the execution of the second and/or third copy-write subcommands CW2 314 and CW3 318. Therefore, the write command W1 320 may disrupt execution atomicity of the copy-write subcommands CW1 310, CW2 314, and CW3 318 across the copy-write subcommand LBA DR. While the write command W1 320 is shown to overlap the first copy-write subcommand CW1 310, any number of read or write commands may be inserted with the multiple subcommand pairs, and may overlap LBAs of any number of copy-read and copy-write subcommands.

Figure 4:
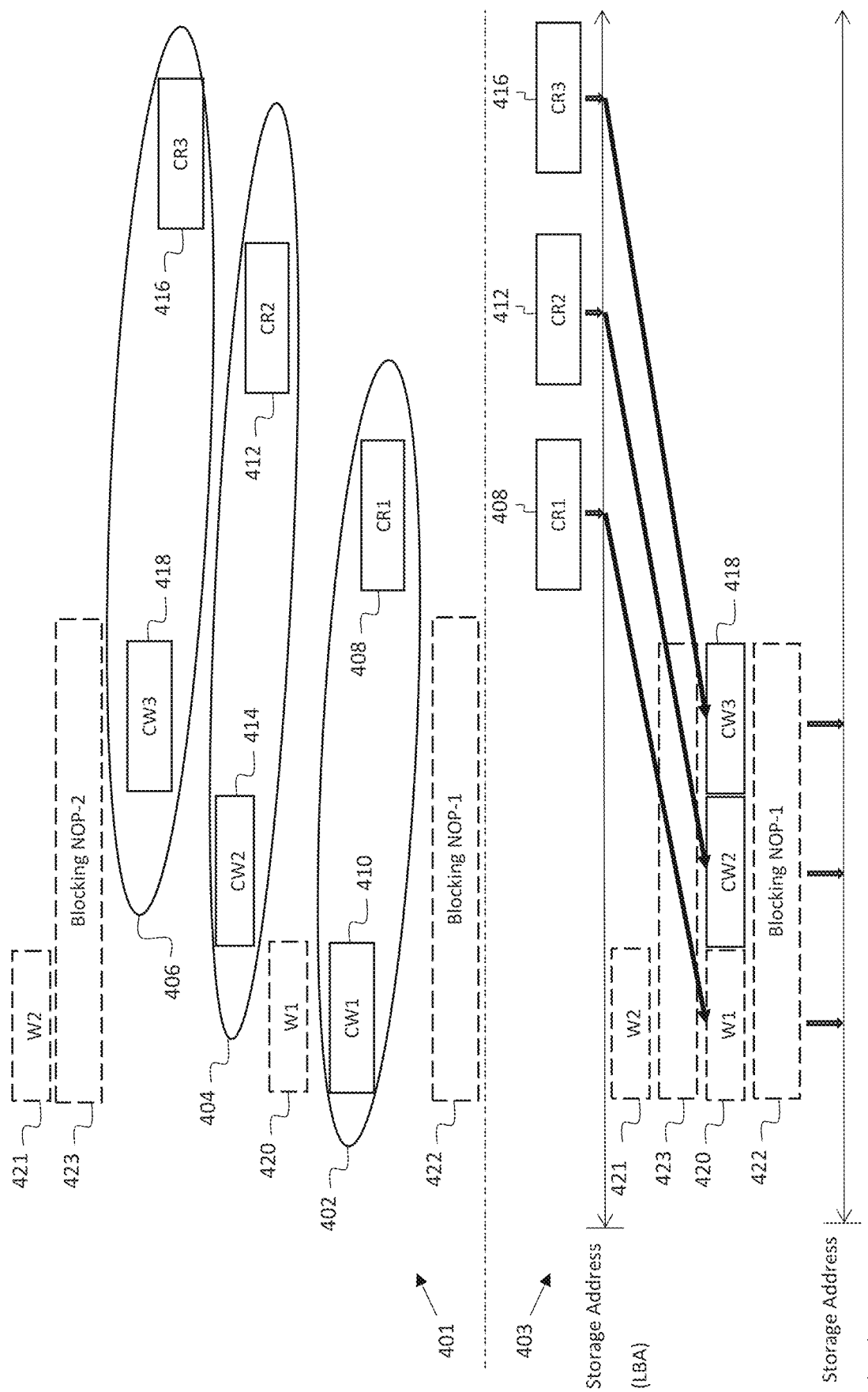
FIG. 4 is a diagram illustrating a copy command, an overlapping non-copy command, and a blocking NOP command in a data storage management system, according to an embodiment.

FIG. 4 is a diagram illustrating a copy command, an overlapping non-copy command, and a blocking NOP command in a data storage management system, according to an embodiment. As described above with respect to FIG. 3, in an insertion sequence 401, the storage device may receive a copy command and a non-copy command from the host. The copy command processor may fetch a source entry for each copy-read subcommand, and may compose copy-read and copy-write subcommand pairs 402, 404, and 406. The first subcommand pair 402 includes a first copy-read subcommand CR1 408 and a first copy-write subcommand CW1 410. The second subcommand pair 404 includes a second copy-read subcommand CR2 412 and a second copy-write subcommand CW2 414. The third subcommand pair 406 includes a third copy-read subcommand CR3 416 and a third copy-write subcommand CW3 418.

A write command W1 may be inserted that has an LBA that overlaps an LBA of the first copy-write subcommand CW1 410. Two possible insertion positions are shown for the write command W1. The write command W1 may be inserted as a first write command W1 420 in a first position amongst the copy subcommands, or as a second write command W2 421 in a second position after the copy subcommands.

In an attempt to prevent any non-copy command from disrupting the atomic execution of the copy-write subcommands, as described above with respect to FIG. 3, a blocking NOP command may be inserted that spans the LBA destination range (DR) (overlaps the LBAs) of the copy-write subcommands CW1 410, CW2 414, and CW3 418. Accordingly, the blocking NOP command may be inserted before the non-copy commands that are to be blocked. With respect to the first write command W1 420, a first blocking NOP command 422 may be inserted before the copy subcommands in order to block the first write command W1 420.

In an execution sequence 403, with respect to the first write command W1 420, the LOC module may determine that the initial insertion of the first blocking NOP command 422 across the LBA DR results in an overlap condition for the first write command W1 420, as well as for the copy-write subcommands. The first write command W1 420 also overlaps the first copy-write subcommand 410, resulting in the situation described above with respect to FIG. 3. However, the position of the first blocking NOP command 422 results in blocking of all of the copy-write subcommands CW1 410, CW2 414, and CW3 418, in addition to any other overlapping non-copy command, preventing execution of the copy command.

The deadlock resulting from the placement of the first blocking NOP command 422 may encourage disabling insertion (or buffering) of all non-copy commands until all subcommands are inserted. The second blocking NOP command 423 may be inserted after the subcommands, and then, insertion of the non-copy commands may be enabled. Therefore, a non-copy command originally intended for insertion as the first write command W1 420, may be inserted instead as the second write command W2 421.

With respect to the second write command W2 421, the LOC module may determine that no overlap exists for the copy-read subcommands CR1 408, CR2 412, and CR3 416, and the copy-write subcommands CW1 410, CW2 414, and CW3 418, which execute as described above with respect to FIG. 2. The second blocking NOP command 423 overlaps the copy-write subcommands CW1 410, CW2 414, and CW 418 and is held pending until atomic execution of the copy-write subcommands is completed and the subcommands are cleared. The second blocking NOP command 423, across the LBA DR, holds the second write command W2 421 or any other command overlapping the copy-write subcommands CW1 410, CW2 414, CW3 418, in a pending state. However, this may result in significant delay for non-copy commands originally scheduled for earlier insertion.

Figure 5:
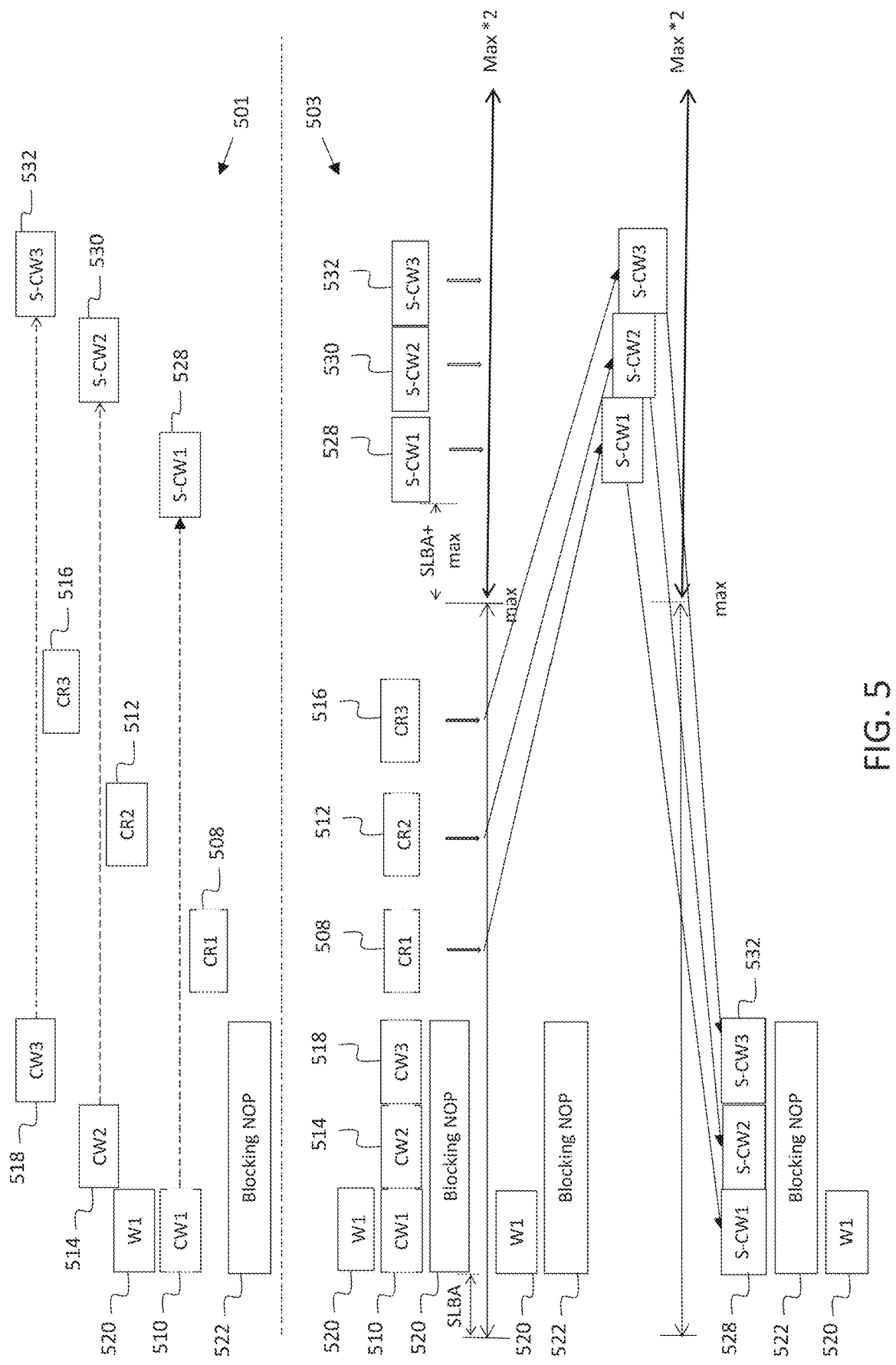
FIG. 5 is a diagram illustrating a copy command, an overlapping non-copy command, a blocking NOP command, and copy-write subcommand mapping in a data storage management system, according to an embodiment.

FIG. 5 is a diagram illustrating a copy command, an overlapping non-copy command, a blocking NOP command, and copy-write subcommand mapping in a data storage management system, according to an embodiment. As described above with respect to FIG. 3, in a command input sequence 501, the data storage device may receive a copy command and a non-copy command from the host. The copy command processor may fetch a source entry for each copy-read subcommand, and may compose copy-read and copy-write subcommand pairs. A first subcommand pair includes a first copy-read subcommand CR1 508 and a first copy-write subcommand CW1 510. A second subcommand pair includes a second copy-read subcommand CR2 512 and a second copy-write subcommand CW2 514. A third subcommand pair includes a third copy-read subcommand CR3 516 and a third copy-write subcommand CW3 518. A copy command may include any number of subcommand pairs.

The copy command processor may also compose and insert a blocking NOP command 522 that spans the LBA DR (or overlaps the LBAs) of the copy-write subcommands CW1 510, CW2 514, and CW3 518. The copy command processor may insert the blocking NOP command 522 before the subcommands of the copy command, and the LOC module may perform a pre-execution overlap check for the inserted blocking NOP command 522. When no overlap exists for the blocking NOP command 522 (e.g., the blocking NOP command is at the head of the queue for the LBA DR) and is ready to execute, the copy command processor may insert the copy-read subcommands CR1 508, CR2 512, and CR3 516 and the copy-write subcommands CW1 510, CW2 514, and CW3 518. A write command W1 520 may also be inserted amongst the copy subcommands. While only a single non-copy command is illustrated in FIG. 5, any number of non-copy commands may be provide before, amongst, or after the subcommand pairs.

The LOC module may perform a pre-execution overlap check on the inserted commands and subcommands, and may determine that there is no overlap for the first copy-read subcommand CR1 508, the second copy-read subcommand CR2 512, and the third copy-read subcommand CR3 516. The LOC module may also determine that the copy-write subcommands CW1 510, CW2, 514, and CW3 518 overlap the blocking NOP command 522, and the write command W1 520 overlaps the first copy-write command CW1 510 and the blocking NOP command 522.

Upon determining the overlap for the copy-write subcommands, a shadow processor (of the controller 106 of FIG. 1) may map the first copy-write subcommand CW1 510 to a shadow first copy-write subcommand S-CW1 528, which is a duplicate or virtual version of the first copy-write subcommand CW1 510 at a corresponding LBA of a shadow storage address space. The shadow storage address space begins after a maximum of LBA of the storage address space, and the first shadow copy-write subcommand S-CW1 528 may be inserted at a shadow LBA that begins after a starting LBA (SLBA) in the shadow storage address space. The shadow storage address space extends a same maximum LBA length as the storage address space.

The shadow processor may also map the second copy-write subcommand CW2 514 to a shadow second copy-write subcommand S-CW2 530, which is a duplicate or virtual version of the second copy-write subcommand CW2 514. The shadow second copy-write subcommand S-CW2 530 may be inserted at a corresponding shadow LBA subsequent to and contiguous with the shadow first copy-write subcommand S-CW1 528. The shadow processor may map the third copy-write subcommand CW3 518 to a shadow third copy-write subcommand S-CW3 532, which is a duplicate or virtual version of the third copy-write subcommand CW3 518. The shadow third copy-write subcommand S-CW3 532 may be inserted at a corresponding shadow LBA subsequent to and contiguous with the shadow second copy-write subcommand S-CW2 530.

In an execution sequence 503, the shadow processor may perform an execution overlap check and may determine that there is no overlap for the shadow first copy-write subcommand S-CW1 528, the shadow second copy-write command S-CW2 530, and the shadow third copy-write subcommand S-CW3 532. The blocking NOP command 522 prevents execution of a command across the LBA RD of the copy-write subcommands. The shadow first copy-write subcommand S-CW1 528 may copy data to the LBA of the first copy-write subcommand CW1 510 for execution, the shadow second copy-write subcommand S-CW2 530 may copy data to the LBA of the second copy-write subcommand CW2 514 for execution, and the shadow third copy-write subcommand S-CW3 532 may copy data to the LBA of the third copy-write subcommand CW3 518 for execution. Simultaneously, the write command W1 520 remains blocked by the blocking NOP command 522.

Accordingly, once the execution overlap check is cleared, multiple copy-ready and copy-write subcommands may be executed concurrently. Each copy-read and copy-write subcommand pair may be executed in a fly-through mode in which LBA data may be written after it has been read, without having to wait for a copy-read subcommand to finish.

Upon atomic execution and clearing of the shadow copy-write subcommands S-CW1 528, S-CW2 530, and S-CW3 532, the LOC module also clears the blocking NOP command 522. The LOC module may determine that no overlap exists for the previously blocked write command W1 520, enabling the write command W1 520 to be released from a pending state and executed. Insertion of the shadow copy-write subcommands S-CW1 528, S-CW2 530, and S-CW3 532 to the shadow LBAs, prevents blocking of the copy-write subcommands by the previously inserted blocking NOP command 522, while still allowing the blocking NOP command 522 to block non-copy commands across the LBA DR of the copy-write subcommands CW1 510, CW2 514, and CW3 518.

Figure 6:
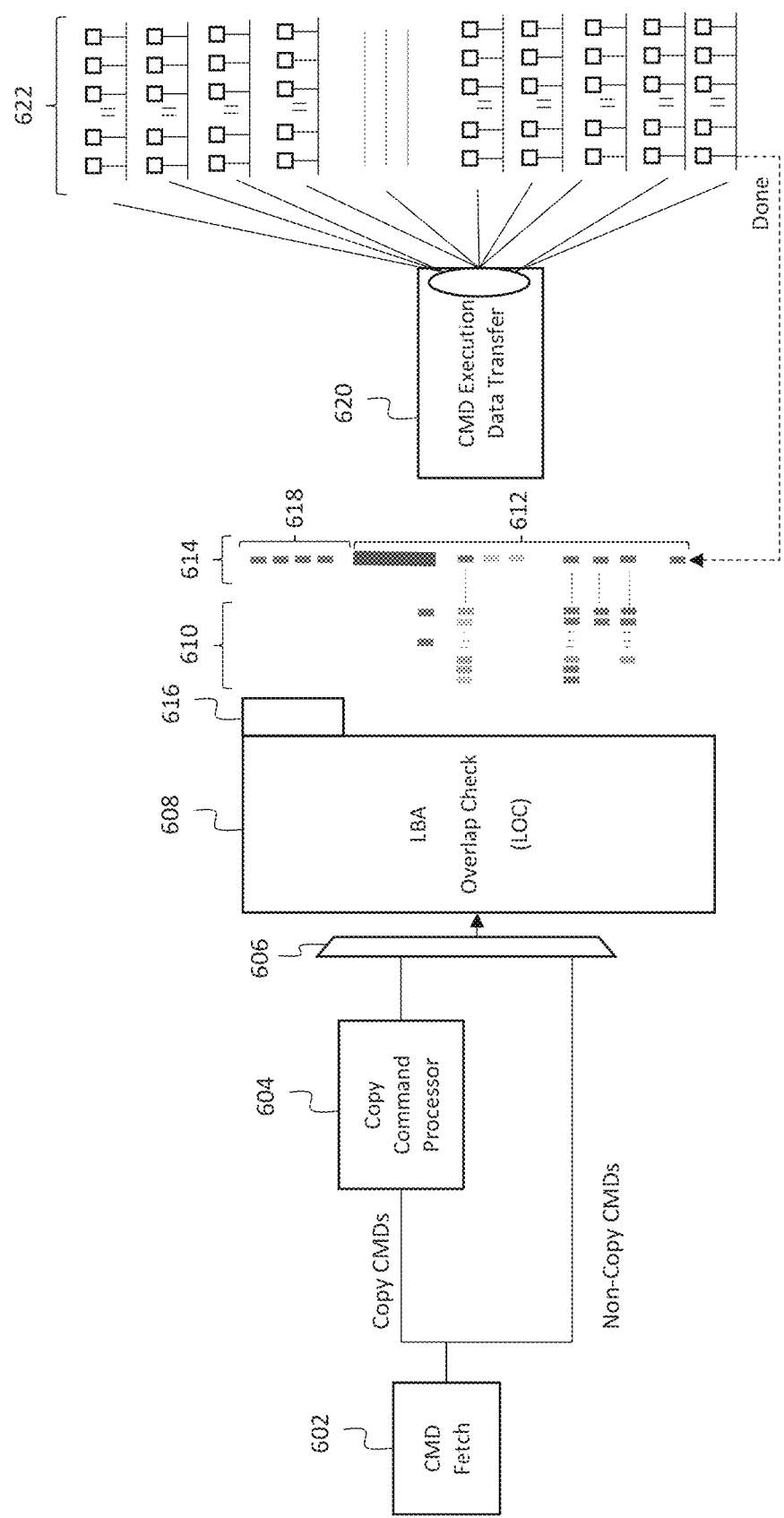
FIG. 6 is a diagram illustrating a data storage management system processing copy and non-copy commands, according to an embodiment.

FIG. 6 is a diagram illustrating a data storage management system processing copy and non-copy commands, according to an embodiment. A command fetcher module 602 (e.g., of the controller 106 in FIG. 1) may fetch copy commands and non-copy commands. Copy commands may be forwarded to a copy command processor 604 (e.g., of the controller 106), which may expand each copy command, compose copy-read subcommand and copy-write subcommand pairs, and determine an LBA DR for the copy-write subcommands of a given copy command.

The copy command processor 604 may compose and insert a blocking NOP command that spans the LBA DR (or overlaps the LBAs) of the copy-write subcommands of the given copy command. The copy command processor 604 may insert the blocking NOP command, via an insertion module 606, before any subcommands of the given copy command. An LOC module 608 (e.g., of the controller 106) may determine that there is no overlap for the blocking NOP command, resulting in the blocking NOP command being positioned at the head of the queue for the LBA DR. The copy command processor 504 may then insert the copy-read and copy-write subcommands via the insertion module 606. Non-copy commands fetched by the command fetch module 602, may also be inserted via the insertion module 606.

The LOC module 608 may perform a pre-execution overlap check on each of the inserted commands and subcommands. Based on the pre-execution overlap check, the copy-read subcommands and the non-copy commands may be provided to a pending queue 610, if there is overlap within the LBAs 612 for previously inserted and not yet cleared commands and/or subcommands. The copy-read subcommands and the non-copy commands may be provided to a front of a queue 614 for execution if there is no overlap within the LBAs 612 for previously inserted commands or subcommands.

The LOC module 608 may determine that the copy-write subcommands overlap the LBA DR of the blocking NOP command, and a shadow processor 616 (e.g., of the controller 106) may map the copy-write commands to shadow copy-write subcommands at LBAs 618, which are duplicate or virtual versions of the copy-write subcommands, as described above with respect to FIG. 5. The shadow processor 610 may also perform an overlap check to determine that there is no overlap for the shadow copy-write subcommands.

FIG. 6 illustrates execution of the commands and subcommands at a command execution data transfer module 620, upon a determination of no overlap by the LOC module 608 and reaching the head of the queues 614 for their respective LBAs. The command execution data transfer module 620 may execute commands and subcommands in accordance with memory modules 622 (e.g. the storage medium 108). While FIG. 6 illustrates a configuration of processors and modules, embodiments are not limited to the illustrated configuration, and different processors and modules may be provided or combined that provide the same or similar functions to those described with respect to FIG. 6.

Figure 7:
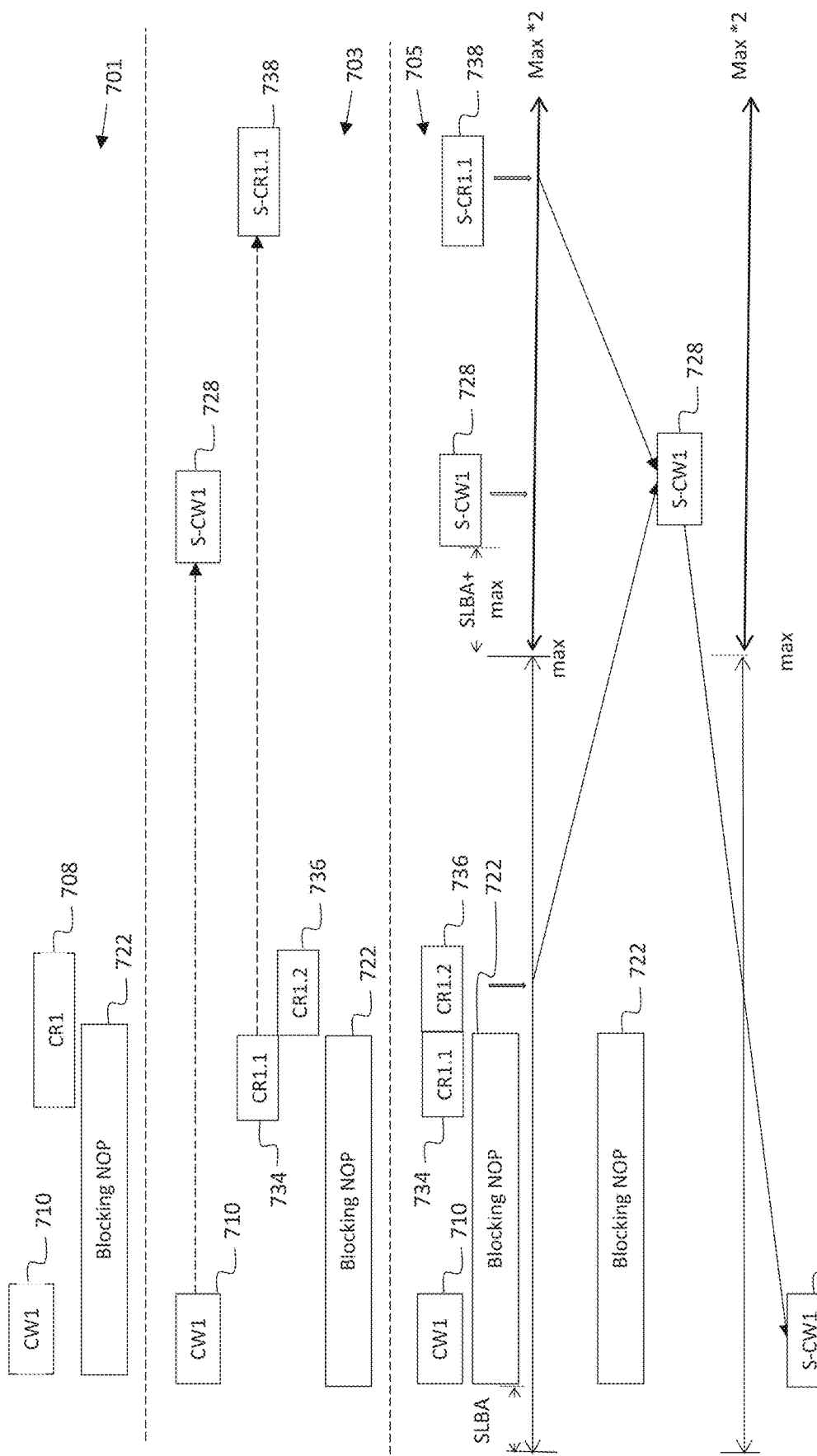
FIG. 7 is a diagram illustrating a copy command with copy-read subcommand overlap in a data storage management system, according to an embodiment.

FIG. 7 is a diagram illustrating a copy command with copy-read subcommand overlap in a data storage management system, according to an embodiment. As described with respect to FIG. 5, the storage device may receive a copy command from the host. In a command input sequence 701, the copy command processor may fetch a source entry for each copy-read subcommand, and may compose copy-read and copy-write subcommand pairs. A first subcommand pair includes a first copy-read subcommand CR1 708 and a first copy-write subcommand CW1 710. The copy command may include any number of additional copy-read and copy-write subcommand pairs, as shown in FIG. 5, for example.

The copy command processor may also compose and insert a blocking NOP command 722 that spans the LBA DR (or overlaps the LBAs) of the copy-write subcommands of the copy command, including the LBA of the first copy-write subcommand CW1 710. The copy command processor may insert the blocking NOP command 722 before any subcommands of the copy command. Upon passing the pre-execution overlap check by the LOC module, and when the blocking NOP command 722 is at the head of the queue for the LBA DR and is ready to execute, the copy-read and copy-write subcommands 708 and 710 may be inserted by the copy command processor.

At 703, the LOC module may perform a pre-execution overlap check on the inserted subcommands, and may determine that the first copy-read subcommand CR1 708 partially overlaps the blocking NOP command 722, and that the first copy-write subcommand CW1 710 fully overlaps the blocking NOP command 722. The shadow processor may map the first copy-write subcommand CW1 710 to a shadow first copy-write subcommand S-CW1 728, which is a duplicate or virtual version of the first copy-write subcommand 710. The shadow first copy-write subcommand S-CW2 728 is inserted as described above with respect to FIG. 5.

Since the blocking NOP command 722 blocks a portion of the first copy-read subcommand CR1 708, the shadow processor may split the first copy-read subcommand 708 into a first copy-read subcommand portion CR1.1 734, which overlaps the blocking NOP command 722, and a second copy-read subcommand portion CR1.2 736, which does not overlap the blocking NOP command 722. The shadow processor may map the first copy-read subcommand portion CR1.1 734 to a shadow first copy-read subcommand portion S-CR1.1 738 at a corresponding shadow LBA in the shadow storage address space.

The shadow processor may perform an overlap check and may determine that there is no overlap for the shadow first copy-write subcommand S-CW1 728 and the shadow first copy-read subcommand portion S-CR1.1 738. In a command execution sequence 705, the first shadow copy-write subcommand S-CW1 728 may copy data to the LBA of the first copy-write subcommand CW1 710 for execution, as described above with respect to FIG. 5, based on execution of the combination of the shadow first copy-read subcommand portion S-CR1.1 738 and the second copy-read subcommand portion CR1.2 736. Specifically, the mapping of the first copy-write subcommand 710 and the first copy-read subcommand portion 734, allows for their execution despite the overlap with the blocking NOP command 722.

Should the LOC module determine that the first copy-read subcommand CR1 708 fully overlaps the blocking NOP command 722, the entire first copy-read subcommand 708 may be mapped to a shadow copy-read subcommand, and the first shadow copy-write subcommand S-CW1 728 may copy data to the LBA of the first copy-write subcommand CW1 710 for execution based on the shadow copy-read subcommand.

Figure 8:
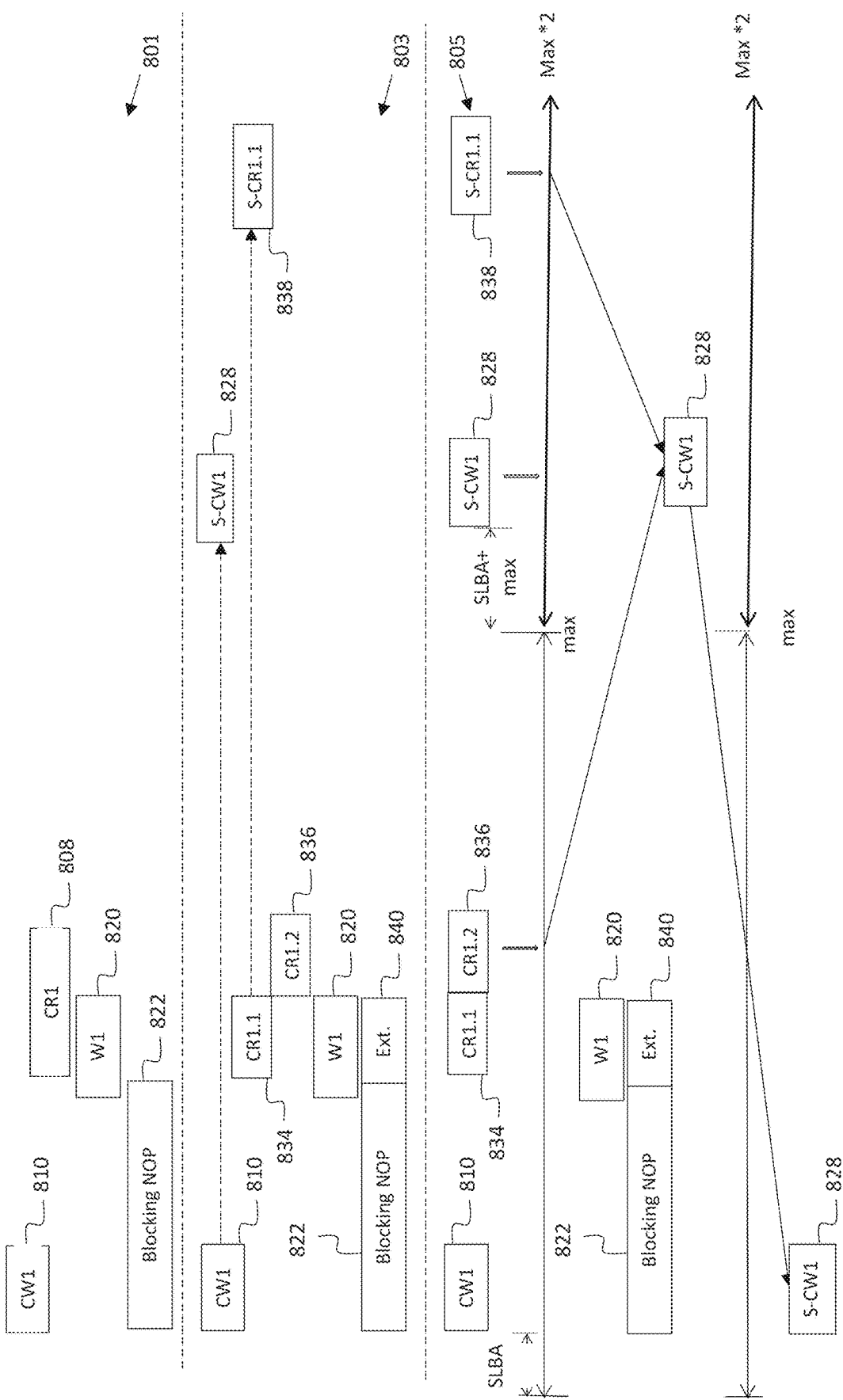
FIG. 8 is a diagram illustrating a copy command with partial write command overlap in data storage management system, according to an embodiment.

FIG. 8 is a diagram illustrating a copy command with write command overlap in a data storage management system, according to an embodiment. As described with respect to FIG. 5, the storage device may receive a copy command and a non-copy command from the host. At a command insertion sequence 801, the copy command processor may fetch a source entry for each copy-read subcommand, and may compose copy-read and copy-write subcommand pairs. A first subcommand pair includes a first copy-read subcommand CR1 808 and a first copy-write subcommand CW1 810. The copy command may include additional copy-read and copy-write subcommands.

The copy command processor may also compose and insert a blocking NOP command 822 that spans the LBA DR (or overlaps the LBAs) of the copy-write subcommands of the copy command, including the LBA of the first copy-write subcommand CW1 810. The copy command processor may insert the blocking NOP command 822 before any subcommands of the copy command. Upon passing the pre-execution overlap check by the LOC module, and when the blocking NOP command 822 is at the head of the queue for the LBA DR and is ready to execute, the copy-read and copy-write subcommands may be inserted by the copy command processor. A write command W1 820 may also be inserted.

At 803, the LOC module may perform a pre-execution overlap check on the inserted commands and subcommands, and may determine that the first copy-write subcommand CW1 810 overlaps the blocking NOP command 822, and that the write command W1 820 partially overlaps the first copy-read subcommand CR1 808 and the blocking NOP command 822.

The copy command processor may extend the blocking NOP command 822 by an extension portion 840 so that it blocks a portion of an LBA range of the write command W1 820 that was previously unblocked by the blocking NOP command 822. However, the first copy-read subcommand CR1 808 partially overlaps the extension portion 840, resulting blocking of the first copy-read subcommand 808.

As described above with respect to FIG. 7, the shadow processor may map the first copy-write subcommand CW1 810, which has an LBA blocked by the executing blocking NOP command 822, to a shadow first copy-write subcommand S-CW1 828, which is a duplicate or virtual version of the first copy-write subcommand 810. The shadow first copy-write subcommand S-CW2 828 may be inserted at a corresponding shadow LBA of a shadow storage address space, as described above with respect to FIG. 5.

The shadow processor may split the first copy-read subcommand 808 into a first copy-read subcommand portion CR1.1 834, which overlaps the blocking NOP command 822, and a second copy-read subcommand portion CR1.2 836, which does not overlap the blocking NOP command 822. The shadow processor may map the first copy-read subcommand portion CR1.1 834 to a shadow first copy-read subcommand portion S-CR1.1 838 at a corresponding shadow LBA of a shadow storage address space, as described above with respect to FIG. 7.

The shadow processor may perform an overlap check and may determine that there is no overlap for the shadow first copy-write subcommand S-CW1 828 and the shadow first copy-read subcommand portion S-CR1.1 838. At an execution sequence 805, the first shadow copy-write subcommand S-CW1 828 may be copied to the LBA of the first copy-write subcommand CW1 810 for execution, as described above with respect to FIG. 5, based on execution of the combination of the shadow first copy-read subcommand portion S-CR1.1 838 and the second copy-read subcommand portion CR1.2 836.

As described above with respect to Claim 7, should the LOC module determine that the first copy-read subcommand CR1 808 fully overlaps the blocking NOP command 822 and the extensions 840, the entire first copy-read subcommand 808 may be mapped to a shadow copy-read subcommand, and the first shadow copy-write subcommand S-CW1 828 may copy data to the LBA of the first copy-write subcommand CW1 810 for execution based on the shadow copy-read subcommand.

Upon atomic execution and clearing of the shadow copy-write subcommands, the blocking NOP command 822 and the extension portion 840 may also be cleared, and the LOC module may determines that no overlap exists for the previously blocked write command W1 820, enabling the write command W1 820 to be released from a pending state and executed.

Figure 9:
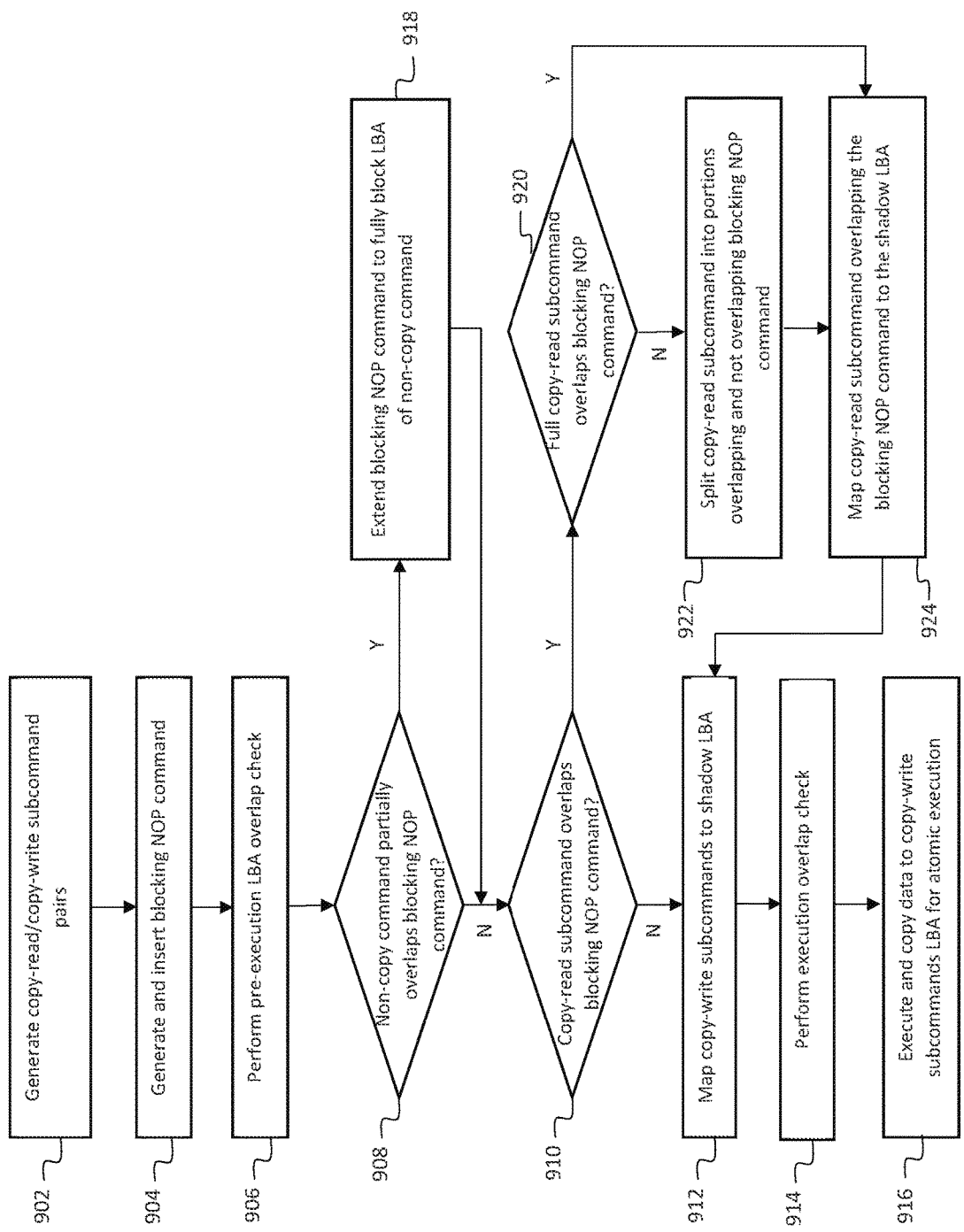
FIG. 9 is a flowchart illustrating a method for processing a copy command in a data storage management system, according to an embodiment.

FIG. 9 is a flowchart illustrating a method for processing a copy command in a data storage management system, according to an embodiment. A storage device may receive a copy command from a host, and a copy command processor may generate copy-read and copy-write subcommand pairs, at 902. A single copy command may include any number of copy-read and copy-write subcommand pairs.

At 904, a copy command processor may generate and insert an blocking NOP command. The blocking NOP command may be composed to span the LBA DR of the copy-write subcommands of the copy command. The blocking NOP command may be inserted before the subcommands of the copy command.

At 906, the copy command processor may insert the subcommands, and an LOC module may perform a pre-execution overlap check for the subcommands and any inserted non-copy commands. The subcommands may be inserted when the blocking NOP command is ready to execute.

At 908, it may be determined whether an inserted non-copy command partially overlaps the blocking NOP command. If the inserted non-copy command does not overlap the blocking NOP command, it is determined whether a copy-read subcommand overlaps the blocking NOP command, at 910.

If a copy-read subcommand does not overlap the blocking NOP command, a shadow processor may generate a mapping of the copy write subcommands, which overlap the blocking NOP command due to the configured LBA span of the blocking NOP command, to corresponding shadow LBAs in a shadow storage address space, at 912. The shadow LBAs may begin after a maximum LBA of the storage address space, and the mapped copy-write subcommands may be mapped after an SLBA from the maximum LBA of the storage address space.

At 914, the shadow processor may perform an execution overlap check for the shadow copy-write subcommands, and may determine that no overlap exists for the shadow copy-write subcommands.

At 916, the shadow copy-write subcommands may copy data to the LBA of the copy-write subcommands for atomic execution. Any inserted non-copy commands may remain blocked by the blocking NOP command. Upon atomic execution and clearing of the copy subcommands, the LOC module may clear the blocking NOP command and allow any non-copy commands, previously blocked by the blocking NOP command, to execute.

If the inserted non-copy command partially overlaps the blocking NOP command, the blocking NOP command may be extended to fully block the LBA of the non-copy command, at 918. Due to the extension of the blocking NOP command, the copy-read subcommand may now overlap the extended blocking NOP command, which is determined at 910. If the copy-read subcommand overlaps the blocking NOP command, it may be determined whether the full copy-read subcommand overlaps the blocking NOP command, at 920. The determination at 920 may also be performed if is determined that the non-copy command does not partially overlap the blocking NOP command at 908 and the copy-read subcommand overlaps the non-extended blocking NOP command, at 910.

If the full copy-read subcommand does not overlap the blocking NOP command (i.e., partial overlap), the copy-read subcommand may be split into a first portion overlapping the blocking NOP command and a second portion not overlapping the blocking NOP command, at 922. At 924, the portion of the copy-read subcommand that overlaps the blocking NOP command may be mapped to a corresponding shadow LBA in the shadow storage address space. If the full copy-read subcommand overlaps the blocking NOP command, the full copy-read subcommand may be mapped to a corresponding shadow LBA in the shadow storage space, at 924. The execution overlap check at 914 may also be performed for the shadow copy-read subcommand or shadow first portion of the copy-read subcommand, and a copy-write subcommand may be executed at 916 in accordance with the shadow copy-read subcommand or the combination of the shadow first portion of the copy-read subcommand and the second portion of the copy-read subcommand.

Figure 10:
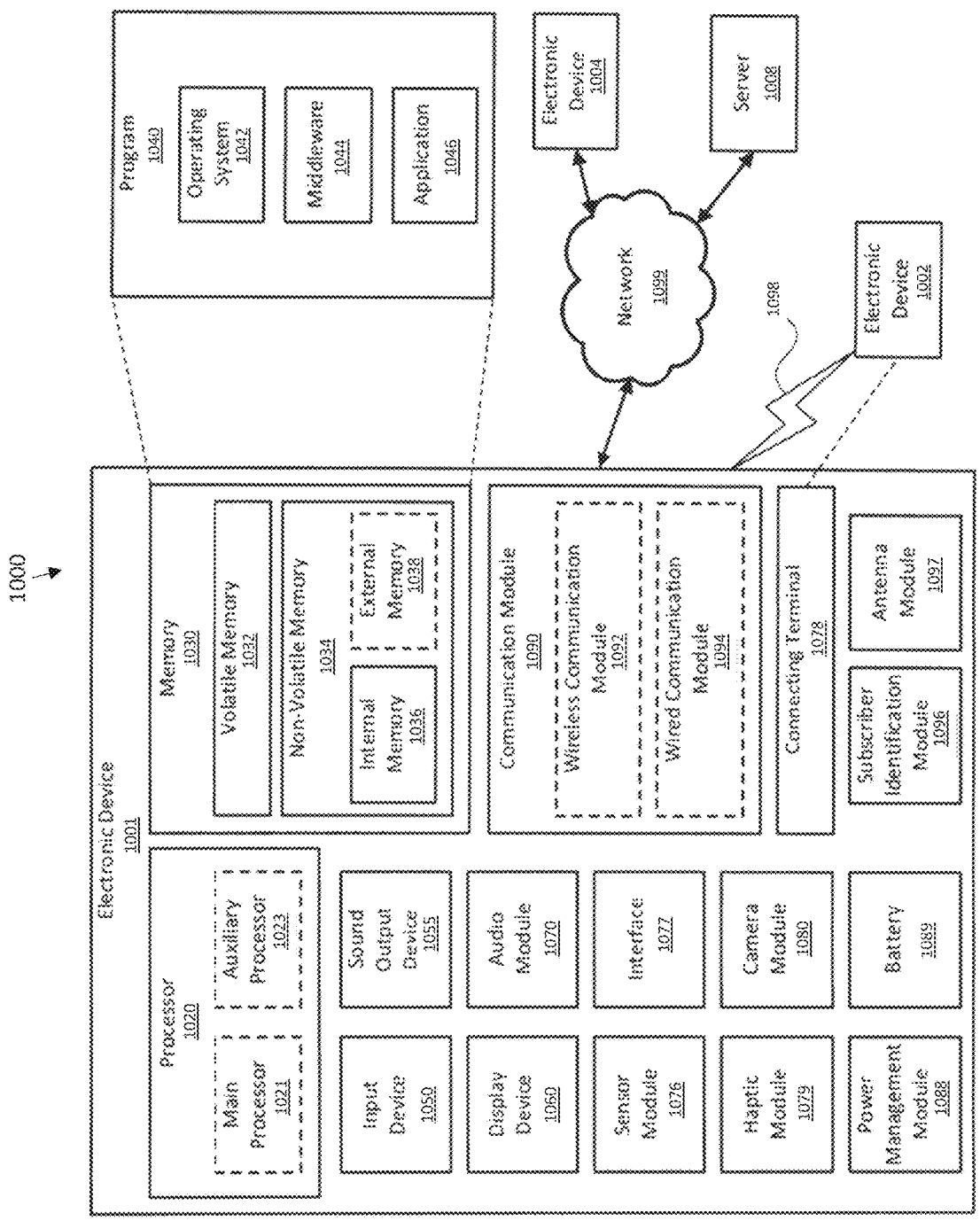
FIG. 10 is a block diagram of an electronic device in a network environment for processing commands, according to an embodiment.

FIG. 10 is a block diagram of an electronic device in a network environment 1000 for processing commands, according to an embodiment. This electronic device may be one of various types of electronic devices that utilizes storage devices described above in FIGS. 1 and 6.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1097. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from a host or another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034. Non-volatile memory 1034 may include internal memory 1036 and/or external memory 1038. The memory 1030 may be embodied as the storage device 104 of FIG. 1.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as BLUETOOTH™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
generating, by a controller of a storage device, copy-read subcommands and copy-write subcommands of a copy command;
executing, by the controller, a blocking no-operation (NOP) command that spans a first storage address range of the copy-write subcommands in a first storage address space and is configured to block execution of a command having a storage address that overlaps the first storage address space range;
generating, by the controller, a mapping of the copy-write subcommands from the first storage address range to mapped copy-write subcommands at a corresponding second storage address range in a second storage address space that begins after a maximum storage address of the first storage address space; and
executing, by the controller, the copy-read subcommands and the mapped copy-write subcommands, wherein the mapped copy-write subcommands copy data for execution at the first storage address range.

2. The method of claim 1, further comprising:
receiving the copy command at the storage device from a host device;
generating, by the controller, the blocking NOP command and inserting the blocking NOP command for execution at the storage device;
inserting, by the controller, the copy-read subcommands and the copy-write subcommands for execution at the storage device, based on execution of the blocking NOP command; and
inserting, by the controller, a non-copy command for execution at the storage device.

3. The method of claim 2, further comprising:
based on insertion of the copy-read subcommands, the copy-write subcommands, and the non-copy command, performing a first overlap check, by the controller, based on storage addresses of the copy-read subcommands, the copy-write subcommands, the non-copy command, and the blocking NOP command.

4. The method of claim 3, further comprising:
determining, based on the first overlap check, storage address overlap between the copy-write subcommands and the blocking NOP command, wherein the mapping of the copy-write subcommands to the mapped copy-write subcommands is based on the storage address overlap; and
determining, based on the first overlap check, storage address overlap between the non-copy command and the blocking NOP command, which blocks the non-copy command from execution at the storage device.

5. The method of claim 4, further comprising:
based on generating the mapping of the copy-write subcommands to the mapped copy-write subcommands, performing, by the controller, a second overlap check based on the mapped copy-write subcommands.

6. The method of claim 4, further comprising:
clearing, by the controller, the copy-write subcommands from the first storage address range, along with the copy-read subcommands, based on completing execution;
clearing, by the controller, the blocking NOP command from the first storage address range based on clearing of the copy-write subcommands;
performing, by the controller, a third overlap check based on the non-copy command; and
executing, by the controller, the non-copy command within the first storage address range.

7. The method of claim 3, further comprising:
determining, based on the first overlap check, partial storage address overlap between the non-copy command and the blocking NOP command;
extending, by the controller, the blocking NOP command beyond the first storage address range resulting in an extended blocking NOP command with full storage address overlap with the non-copy command and at least partial storage address overlap with a copy-read subcommand; and
generating, by the controller, a mapping of at least a portion of the copy-read subcommand, having storage address overlap with the extended blocking NOP command, to a storage address that begins after the maximum address of the storage device, wherein the copy-read subcommands are executed using the at least a portion of the copy-read subcommand.

8. The method of claim 3, further comprising:
determining, based on the first overlap check, at least partial storage addresses overlap between a copy-read subcommand and the blocking NOP command; and
generating, by the controller, a mapping of at least a portion of the copy-read subcommand, having storage address overlap with the blocking NOP command, to a storage address that begins after the maximum address of the storage device, wherein the copy-read subcommands are executed using the at least a portion of the copy-read subcommand.

9. A storage device, comprising:
a storage medium; and
a controller configured to:
generate copy-read subcommands and copy-write subcommands of a copy command;
execute a blocking no-operation (NOP) command that spans a first storage address range of the copy-write subcommands in a first storage address space and is configured to block execution of a command having a storage address that overlaps the first storage address space range;
generate a mapping of the copy-write subcommands from the first storage address range to mapped copy-write subcommands at a corresponding second storage address range in a second storage address space that begins after a maximum storage address of the first storage address space; and
execute the copy-read subcommands and the mapped copy-write subcommands, wherein the mapped copy-write subcommands copy data for execution at the first storage address range.

10. The storage device of claim 9, wherein the controller is further configured to:
receive the copy command from a host device;
generate the blocking NOP command and inserting the blocking NOP command for execution;

insert the copy-read subcommands and the copy-write subcommands for execution, based on execution of the blocking NOP command; and insert a non-copy command for execution.

11. The storage device of claim 10, wherein the controller is further configured to:

based on insertion of the copy-read subcommands, the copy-write subcommands, and the non-copy command, perform a first overlap check based on storage addresses of the copy-read subcommands, the copy-write subcommands, the non-copy command, and the blocking NOP command.

12. The storage device of claim 11, wherein the controller is further configured to:

determine, based on the first overlap check, storage address overlap between the copy-write subcommands and the blocking NOP command, wherein the mapping of the copy-write subcommands to the mapped copy-write subcommands is based on the storage address overlap; and determine, based on the first overlap check, storage address overlap between the non-copy command and the blocking NOP command, which blocks the non-copy command from execution at the storage device.

13. The storage device of claim 12, wherein the controller is further configured to:

based on generating the mapping of the copy-write subcommands to the mapped copy-write subcommands, perform a second overlap check based on the mapped copy-write subcommands.

14. The storage device of claim 12, wherein the controller is further configured to:

clear the copy-write subcommands from the first storage address range, along with the copy-read subcommands, based on completing execution;

clear the blocking NOP command from the first storage address range based on clearing of the copy-write subcommands;

perform a third overlap check based on the non-copy command; and execute the non-copy command within the first storage address range.

15. The storage device of claim 11, wherein the controller is further configured to:

determine, based on the first overlap check, partial storage address overlap between the non-copy command and the blocking NOP command;

extend the blocking NOP command beyond the first storage address range resulting in an extended blocking NOP command with full storage address overlap with the non-copy command and at least partial storage address overlap with a copy-read subcommand; and generate a mapping of at least a portion of the copy-read subcommand, having storage address overlap with the extended blocking NOP command, to a storage address that begins after the maximum address of the storage device, wherein the copy-read subcommands are executed using the at least a portion of the copy-read subcommand.

16. The storage device of claim 11, wherein the controller is further configured to:

determine, based on the first overlap check, at least partial storage addresses overlap between a copy-read subcommand and the blocking NOP command; and generate a mapping of at least a portion of the copy-read subcommand, having storage address overlap with the blocking NOP command, to a storage address that begins after the maximum address of the storage device, wherein the copy-read subcommands are executed using the at least a portion of the copy-read subcommand.

17. A storage device, comprising:

a storage medium; and a controller configured to:

generate copy-read subcommands and copy-write subcommands of a copy command;

execute a blocking no-operation (NOP) command that spans a first storage address range of the copy-write subcommands in a first storage address space;

determine storage address overlap based on the copy-read subcommands, the copy-write subcommands, and blocking NOP command;

generate a mapping of the copy-write subcommands from the first storage address range to mapped copy-write subcommands at a corresponding second storage address range in a second storage address space that begins after a maximum storage address of the first storage address space, based on determining storage address overlap between the copy-write subcommands and the blocking NOP command; and execute the copy-read subcommands and the mapped copy-write subcommands, wherein the mapped copy-write subcommands copy data for execution at the first storage address range.

18. The storage device of claim 17, wherein the controller is further configured to:

clear the copy-write subcommands from the first storage address range, along with the copy-read subcommands, based on completing atomic execution;

clear the blocking NOP command from the first storage address range based on clearing of the copy-write subcommands; and execute a non-copy command within the first storage address range, wherein the overlap check module performs an overlap check based on the non-copy command.

19. The storage device of claim 17, wherein the controller is further configured to:

determine partial storage address overlap between a non-copy command and the blocking NOP command;

extend the blocking NOP command beyond the first storage address range resulting in an extended blocking NOP command with full storage address overlap with the non-copy command and at least partial storage address overlap with a copy-read subcommand;

generate a mapping of at least a portion of the copy-read subcommand, having storage address overlap with the extended blocking NOP command, to a storage address that begins after the maximum address of the storage device; and execute the copy-read subcommands using the at least a portion of the copy-read subcommand.

20. The storage device of claim 17, wherein the controller is further configured to:

the overlap check module is further configured to determine at least partial storage addresses overlap between a copy-read subcommand and the blocking NOP command;

the shadow processor is further configured to generate a mapping of at least a portion of the copy-read subcommand, having storage address overlap with the blocking NOP command, to a storage address that begins after the maximum address of the storage device; and the command execution module executes the copy-read subcommands using the at least a portion of the copy-read subcommand.

\* \* \* \* \*